May 19, 1936.  K. SHINODA  2,041,681
ORNAMENTAL FLOWER HOLDING DEVICE
Filed Nov. 20, 1935
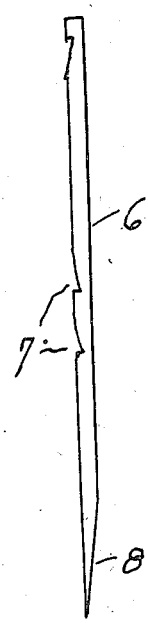
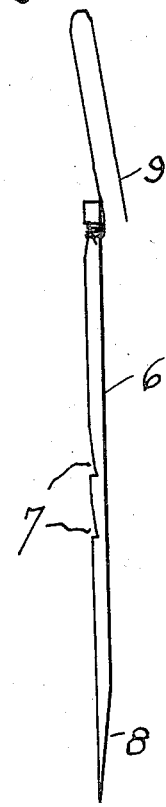
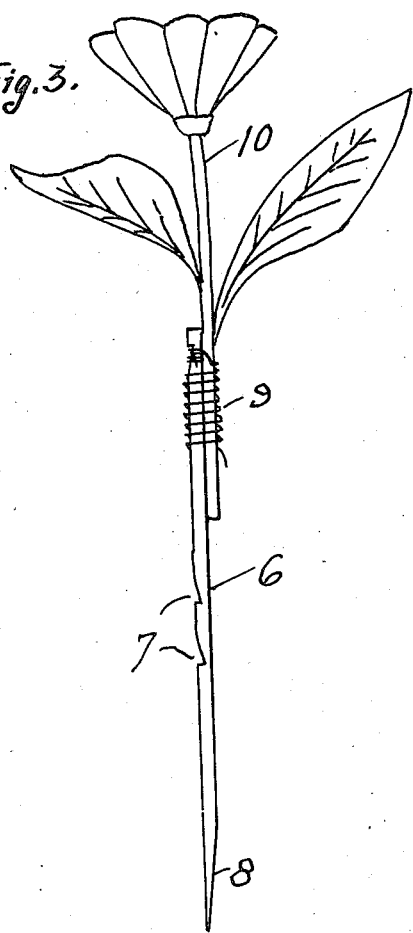
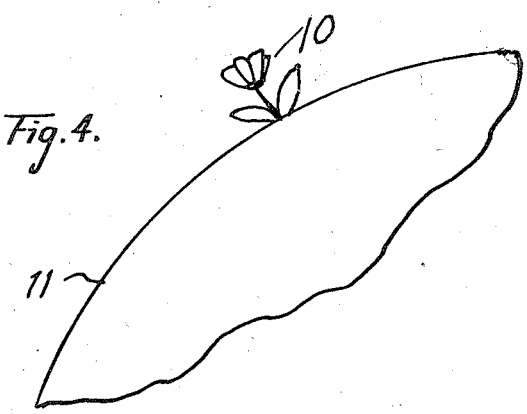
INVENTOR.
KUMAICHIRO SHINODA.
BY Edward M. Kojima
ATTORNEYS.

Patented May 19, 1936

2,041,681

UNITED STATES PATENT OFFICE 2,041,681

ORNAMENTAL FLOWER-HOLDING DEVICE

Kumaichiro Shinoda, Los Angeles, Calif., assignor to San Lorenzo Nursery Company, Los Angeles, Calif.

Application November 20, 1935, Serial No. 50,801

5 Claims. (Cl. 47—55)

This invention relates to a flower-holding device by which ornamental and artificial flowers may be attached to suitable frames such as are employed for flower displays and decorative purposes.

Heretofore, ordinary wooden sticks have been employed for this purpose, but such wooden sticks absorb water and become soft and unfit for use. The stick I use in my device is made of bamboo wood, which is hard surfaced and does not absorb water. My device is further provided with notches in its hard surface thereby preventing its easy withdrawal from the frame. My device is further provided with a certain cross-section whereby it does not strip. The bamboo bark material further has a smooth and glossy appearance.

In the drawing, Figure 1 is a side view of the body part of my new device. Fig. 2 is a side view of the device. Fig. 3 is a side view showing the device applied to and supporting a flower. Fig. 4 is a fragmentary view of a frame showing a flower attached thereto. Fig. 5 is a cross-section of the body portion of my device.

Referring more particularly to the drawing, the body 6 is provided with notches 7 whereby it may be more readily retained in a supporting frame 11, and has a pointed end 8. At the upper end I provide wire clamp 9 whereby the flower may be secured to the body 6. Clamp 9 is wrapped around the body 6 and the stem of flower 10.

From the foregoing description and drawing it may be seen that I have provided an ornamental flower-holding device which is readily attached to a flower, which is practically water-proof, which has a smooth glossy surface, and which is formed so that it does not split or crack in use.

I claim:

1. A flower-supporting device, comprising a body portion having notches in the side thereof and an upper end, a pointed lower end, and a wire clamp secured to the upper end.

2. A flower-holding device, comprising a body portion with a trapezoid cross-section and an upper end, notches in the side thereof, a pointed lower end, and a wire clamp secured to the upper end.

3. A flower-holding device, comprising a body with a pointed lower end and a notched upper end, notches in the side of the body, and a wire clamp secured to the upper end.

4. A flower-holding device, comprising a bamboo body, notched in one side, and a wire clamp secured to one end.

5. A flower-holding device, comprising a bamboo-body with a trapezoid cross-section and an upper end, a smooth glossy surface on one side of said body, a pointed lower end, and a wire clamp secured to the upper end.

KUMAICHIRO SHINODA.